United States Patent
Fan et al.

(10) Patent No.: US 8,180,164 B2
(45) Date of Patent: May 15, 2012

(54) OCR-GUIDED TEXT TOKENIZATION OF DIGITAL IMAGES

(75) Inventors: Zhigang Fan, Webster, NY (US); Francis Tse, Rochester, NY (US); Michael R. Campanelli, Webster, NY (US); Yingjun Bai, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 782 days.

(21) Appl. No.: 12/335,624

(22) Filed: Dec. 16, 2008

(65) Prior Publication Data

US 2010/0150460 A1     Jun. 17, 2010

(51) Int. Cl.
*G06K 9/36* (2006.01)
*G06K 9/20* (2006.01)
*G06K 9/46* (2006.01)

(52) U.S. Cl. ........................... 382/232; 382/321

(58) Field of Classification Search .................. 382/181, 382/187, 203, 218–220, 229, 232, 243, 254, 382/260–264, 274, 275, 321; 358/1.1, 1.14, 358/1.15, 1.2
See application file for complete search history.

(56) References Cited

U.S. PATENT DOCUMENTS

| | | | | |
|---|---|---|---|---|
| 5,438,628 A | * | 8/1995 | Spitz et al. | 382/181 |
| 5,884,014 A | * | 3/1999 | Huttenlocher et al. | 358/1.15 |
| 5,953,451 A | * | 9/1999 | Syeda-Mahmood | 382/187 |
| 6,020,972 A | * | 2/2000 | Mahoney et al. | 358/1.14 |
| 6,269,189 B1 | * | 7/2001 | Chanod | 382/229 |
| 6,275,301 B1 | * | 8/2001 | Bobrow et al. | 358/1.2 |
| 7,450,760 B2 | * | 11/2008 | Molnar et al. | 382/181 |
| 2004/0042019 A1 | * | 3/2004 | Moro | 358/1.9 |
| 2007/0201752 A1 | * | 8/2007 | Gormish et al. | 382/232 |
| 2010/0150460 A1 | * | 6/2010 | Fan et al. | 382/232 |

* cited by examiner

*Primary Examiner* — Amir Alavi
(74) *Attorney, Agent, or Firm* — Fay Sharpe LLP

(57) ABSTRACT

An image processing method in which OCR is used to guide the text tokenization. More particularly, OCR is first performed on each symbol in the scanned image. For example, a symbol may be a number, letter, or other character. During the tokenization process, the OCR results are used to select appropriate matching criteria for each symbol. The symbols that are recognized as different characters are not allowed to be clustered into the same group. The symbols with the same OCR results are clustered according to the recognition confidence levels.

15 Claims, 4 Drawing Sheets

OCR-GUIDED TEXT TOKENIZATION OF DIGITAL IMAGES

BACKGROUND

The methods and systems disclosed herein are related to the art of digital image processing and compression.

By way of background, image compression refers generally to the application of data compression on digital images. In effect, the objective is to reduce redundancy of the image data in order to be able to store or transmit data in an efficient form.

For example, JBIG2 is an image compression standard for bi-level images, developed by the Joint Bi-level Image Experts Group. It is suitable for both lossless and lossy compression. In its lossless mode JBIG2 typically generates files one third to one fifth the size of Fax Group 4 and one half to one quarter the size of JBIG, the previous bi-level compression standard released by the Group.

Tokenization is a powerful tool that clusters text into groups. It has been used in JBIG2 image compression and in scanned text editing (Adobe). In image compression, it outperforms Fax Group 4 by a factor of 3-5 in lossless mode in terms of compression ratio.

Tokenization typically works in the following manner. First, a dictionary is created, which is empty initially. Next, each symbol found in a scanned document is matched to the symbols in the dictionary. If a match is found, the symbol is clustered to the group specified by the dictionary symbol. Otherwise, a new cluster is created and the symbol is added to the dictionary. Although not required, a symbol typically corresponds to a character of text.

In JBIG2, tokenization can both be lossless and lossy. In lossless mode, the matching error (between the symbol in the document and the symbol in the dictionary) is losslessly coded. In lossy mode, the error may be partially or entirely discarded. Furthermore, additional prefiltering might be performed before tokenization to smooth out shape variations and encourage matching.

The matching usually does not need to be perfect. It should tolerate slight variations for the characters of the same shape. There is a tradeoff between accuracy and coding efficiency. A too tight matching criterion may result in too many clusters. In other words, the same character with slight variations may be classified as different clusters. On the other hand, a too loose matching criterion may generate too few clusters and run the risk of cluster two different characters into the same group. The misclustering may also be a consequence of prefiltering. In some cases, filtering slightly changes the shape, but sufficiently large to cause misclassification.

Morphological dilation is commonly used image filtering technology. When applied to the text, it will typically make characters thicker and smoother. The degree of thickness/smoothness is controlled by the "structuring element" used in dilation. A detailed description of dilation and structuring elements can be found in R. Gonzalez and R. Woods *Digital Image Processing*, Addison-Wesley Publishing Company, 1992, pp 518-519, 549. In tokenization, dilation is often applied as pre-filtering to reduce the impact of slight variation. By way of example, FIG. 1 represents an image filtered by a dilation with a 2×2 structuring element. FIG. 2 is the result after JBIG2 compression. Note that the number "385,3 65" in the third line became "385,385" due to misclustering.

The exemplary embodiments disclosed herein contemplate new and improved methods and systems that resolve the above-referenced difficulties and others.

BRIEF DESCRIPTION

According to an aspect of the exemplary embodiments, an image processing method is provided. The method includes: scanning an input image via an image input device; compressing the scanned image using an image compression tool by performing OCR (Optical Character Recognition) on each symbol in the scanned image to generate OCR results and then performing tokenization on the scanned image using the OCR results; and storing the compressed image in a storage device or printing the compressed image via an image output device after it has been decoded.

Also, during the tokenization process, the OCR results may be used to select appropriate matching criteria for each symbol. For each symbol, OCR often provides a list of possible recognition candidates, ordered in decreasing confidence levels. We define the first and second results (the one with the highest and the second highest confidence levels) the primary and secondary results, respectively. The symbols that are recognized as different characters are not allowed to be clustered into the same group, and the symbols with the same OCR results are clustered according to a pre-defined set of recognition confidence levels.

Several rules may be applied during the tokenization process. The symbols with different primary OCR results are not clustered into the same group. For symbols with the same primary OCR result: if both symbols have high confidence levels for primary results and low confidence levels for secondary results, use a loose matching criteria to allow large shape variation; if both symbols have high confidence levels for primary results and at least one has a high confidence levels for its secondary results, use a tight matching criteria to avoid misclassification; and if at least one symbol has a low confidence level for its primary result, use a moderate to tight matching criteria.

According to another aspect of the exemplary embodiments, an image processing system is provided. The system includes: an image input device for scanning an input image; an image processing device connected to the image input device and operative to compress the scanned image using an image compression tool by performing OCR (Optical Character Recognition) on the scanned image to generate OCR results and then performing tokenization on the scanned image using the OCR results; a storage device connected to the image processing device and operative to store the compressed image; and an image output device connected to the image processing device and operative to print the compressed image after it has been decoded.

The system may be further operative to use the OCR results to select appropriate matching criteria for each symbol during the tokenization process. The symbols that are recognized as different characters are not allowed to be clustered into the same group, and the symbols with the same OCR results are clustered according to a pre-defined set of recognition confidence levels.

Several rules may be applied during the tokenization process. The symbols with different primary OCR results are not clustered into the same group. For symbols with the same primary OCR result: if both symbols have high confidence levels for primary results and low confidence levels for secondary results, use a loose matching criteria to allow large shape variation; if both symbols have high confidence levels for primary results and at least one has a high confidence levels for its secondary results, use a tight matching criteria to avoid misclassification; and if at least one symbol has a low confidence level for its primary result, use a moderate to tight matching criteria.

According to yet another aspect of the exemplary embodiments, a computer program product is provided. The computer program product includes a computer-usable data carrier storing instructions that, when executed by a computer, cause the computer to perform a method. This method includes: scanning an input image via an image input device; compressing the scanned image using an image compression tool by performing OCR (Optical Character Recognition) on the scanned image to generate OCR results and then performing tokenization on the scanned image using the OCR results; and storing the compressed image in a storage device or printing the compressed image via an image output device after it has been decoded.

The instructions may further provide that the OCR results can be used to select appropriate matching criteria for each symbol during the tokenization process. The symbols that are recognized as different characters are not allowed to be clustered into the same group, and the symbols with the same OCR results are clustered according to a pre-defined set of recognition confidence levels.

Several rules may be applied during the tokenization process. The symbols with different primary OCR results are not clustered into the same group. For symbols with the same primary OCR result: if both symbols have high confidence levels for primary results and low confidence levels for secondary results, use a loose matching criteria to allow large shape variation; if both symbols have high confidence levels for primary results and at least one has a high confidence levels for its secondary results, use a tight matching criteria to avoid misclassification; and if at least one symbol has a low confidence level for its primary result, use a moderate to tight matching criteria.

BRIEF DESCRIPTION OF THE DRAWINGS

FIG. 1 is an image filtered by 2×2 dilation;

FIG. 2 is same image after JBIG2 compression;

DETAILED DESCRIPTION

As used herein, the term "data" refers generally to physical signals that indicate or include information. The terms "image" and "page," as used herein, refer to any image containing any, or all, of one or more halftone images, continuous tone images, line art or other graphics images, and/or any compilation of text, that is capable of being displayed on a display device or output on an image bearing substrate. For example, an image may be a combination of graphics and text that is stored in an image input device. The image may be a series of pixel values denoting the color, intensity, and/or any other known or later developed image property of the particular pixels that make up the image.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image.

An image can be digital, where the various forms of pixel values (i.e., bit, gray scale value, etc.) are numerical values, or an image can be physical, such as colorants printed on a page, where pixel values are amounts of colorants at respective pixel locations. An operation typically performs "image processing" when it operates on an item of data that relates to part of an image.

An "image input device" is a device that can receive an image and provide an item of data defining a version of the image. A "scanner" is an image input device that receives an image by a scanning operation, such as by scanning a document. An "image output device" is a device that can receive an item of data defining an image and provide or render the image as output. A "display" is an image output device that provides the output image in human viewable form. "Halftoning" refers generally to rendering the digital image to a bit map form that can be used to drive the imaging device and includes a process that prepares the pixels for driving the imaging devices. For printing devices, the halftone image that is created is usually in a form such binary pixels, high addressability pixels, pulse width modulation codes, or some reduced quantization form that is compatible with the imaging device in the printer.

Figure 3:
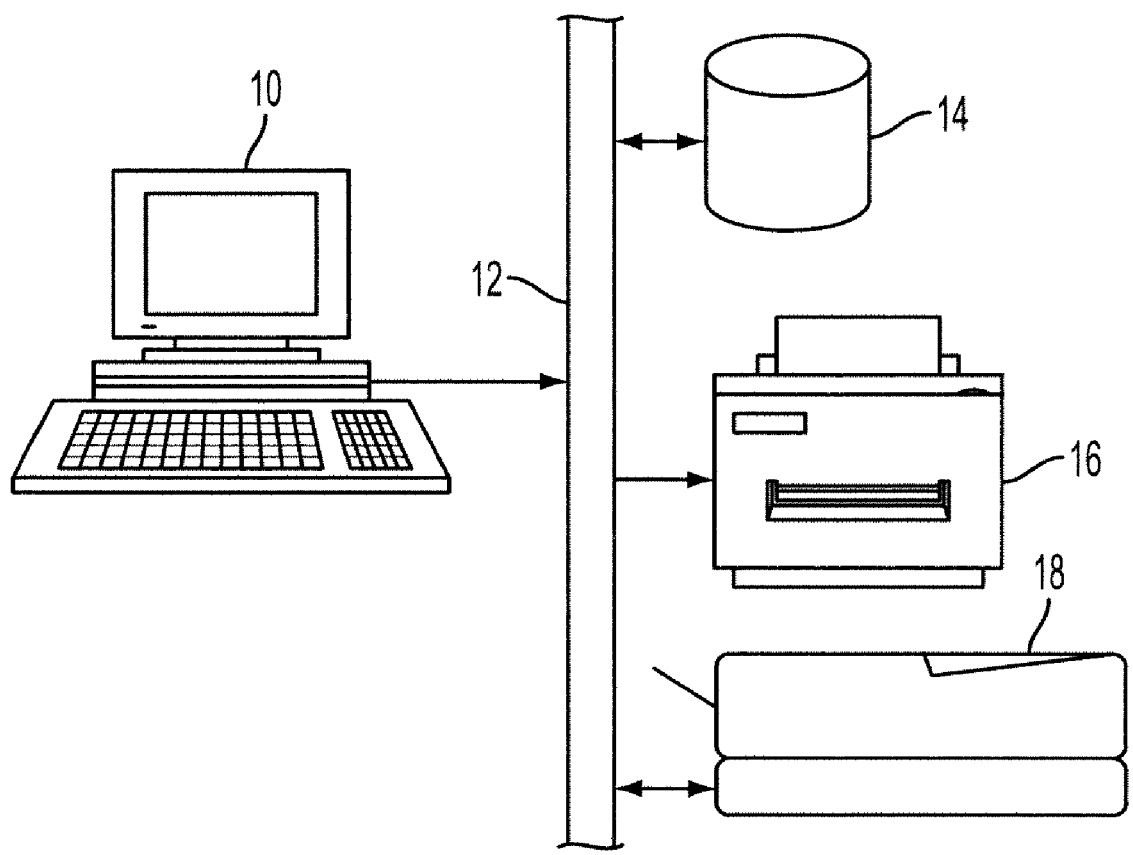
FIG. 3 is a block diagram of an image processing device suitable for implementing aspects of the exemplary embodiments.

FIG. 3 shows an image processing device 10, connected via a network connection 12 to a text and graphics document storage device 14. The image processing device 10 may also be associated with an image input device such as a scanning system 16. The computer workstation may be associated with an image data output device (or printing system) 18 for reproduction of documents in hard copy.

The image processing device 10 is capable of receiving the adjusted image data and supplying image data to the image data output device 18. For example, the image processing device 10 may be a computer, a microprocessor, a scanner processor, a network server, a print server, photocopying device and/or any other known or later developed device or system that is able to receive and provide image data. The image processing device 10 may include a plurality of components including displays, user interfaces, memory, disk drives, tape drives, hard disks, flash drives, zip drives, CD-ROM drives, DVD drives, and the like. For simplicity of the following description of the exemplary embodiments, it will be assumed that the image processing device 10 is a personal computer.

The image output device 18 is any type of device that is capable of outputting an image. For example, the image output device 18 may be a laser printer, bubble jet printer, ink jet printer, photocopying machine, or any other known or later developed device or system that is able to generate an image on a recording medium or display an image using image data or data generated from the image data. The image output device 18 generates an image based on the adjusted image data from the image processing device 10. While FIG. 1 shows a single image output device 18, multiple image output devices 18 may be coupled to the image processing device 10.

The storage device 14 may include an image compression tool such as a JBIG2 encoder. Generally, the JBIG2 encoder segments the scanned input page into regions of text, regions of halftone images, and regions of other data. Regions which are neither text nor halftones are typically compressed using a context-dependent arithmetic coding algorithm called the QM coder. Textual regions are typically compressed in the following manner. The foreground pixels in the regions are grouped into symbols. A dictionary of symbols is then created and encoded, typically also using context-dependent arithmetic coding, and the regions are encoded by describing which symbols appear where. Generally, a symbol will correspond to a character of text, but this is not required by the compression method. For lossy compression the difference between similar symbols (e.g., slightly different impressions of the same letter) can be neglected; for lossless compression, this difference is taken into account by compressing one similar symbol using another as a template. Halftone images may be compressed by reconstructing the grayscale image used to generate the halftone and then sending this image together with a dictionary of halftone patterns.

The processing steps that will be described herein may take place either on the image processing device 10 or at a dedicated server or processor associated with the storage device 14. As another alternative, the processing described may take place within the scanner itself, or at the output device 18, if they are equipped with the appropriate processors. This may well be the case in the situation of a digital copier, which is equivalent to the computer/scanner/printer combination described herein.

Figure 4:
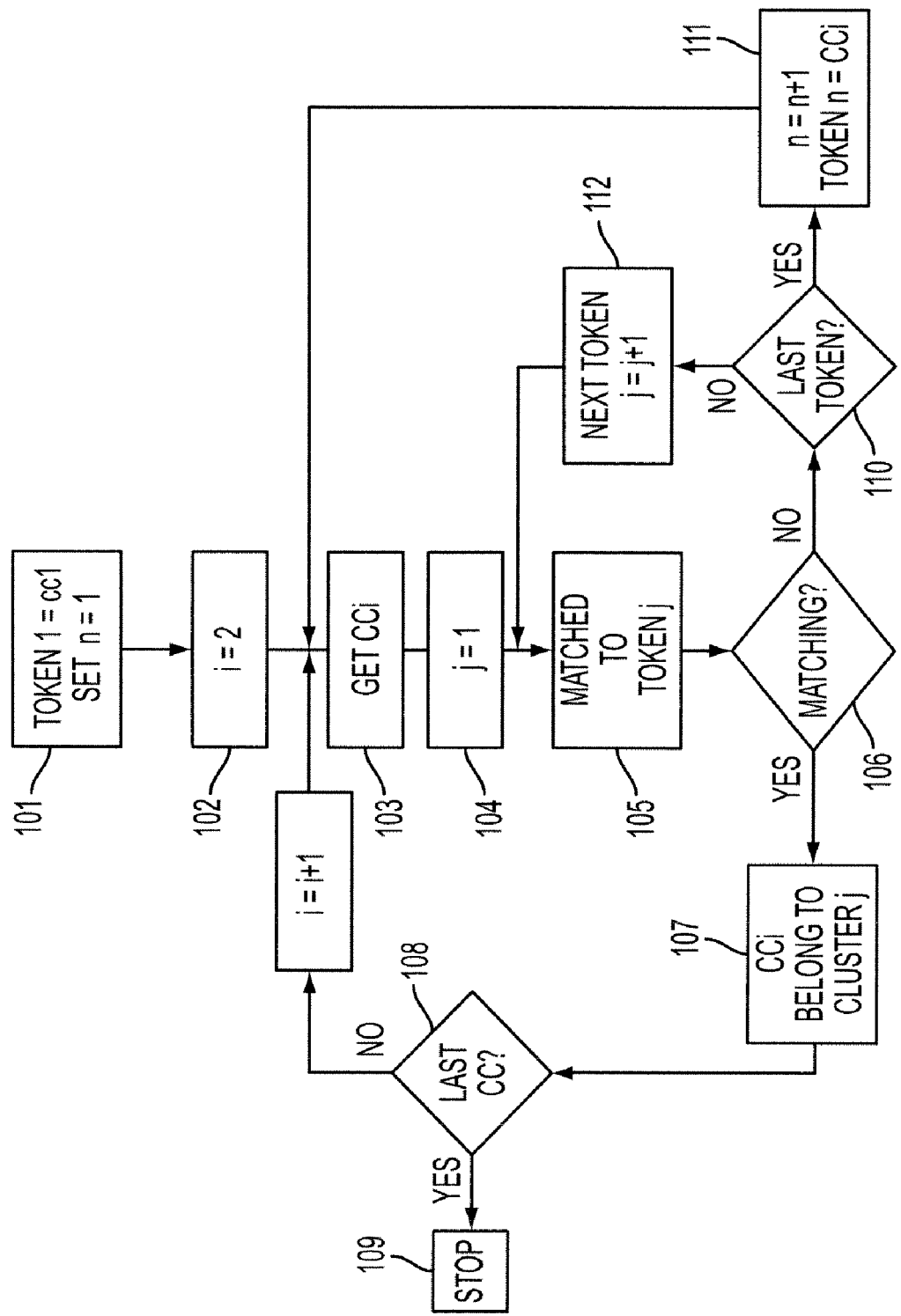
FIG. 4 is a flow diagram further illustrating a tokenization algorithm incorporating aspects of the exemplary embodiments.
Figure 5:
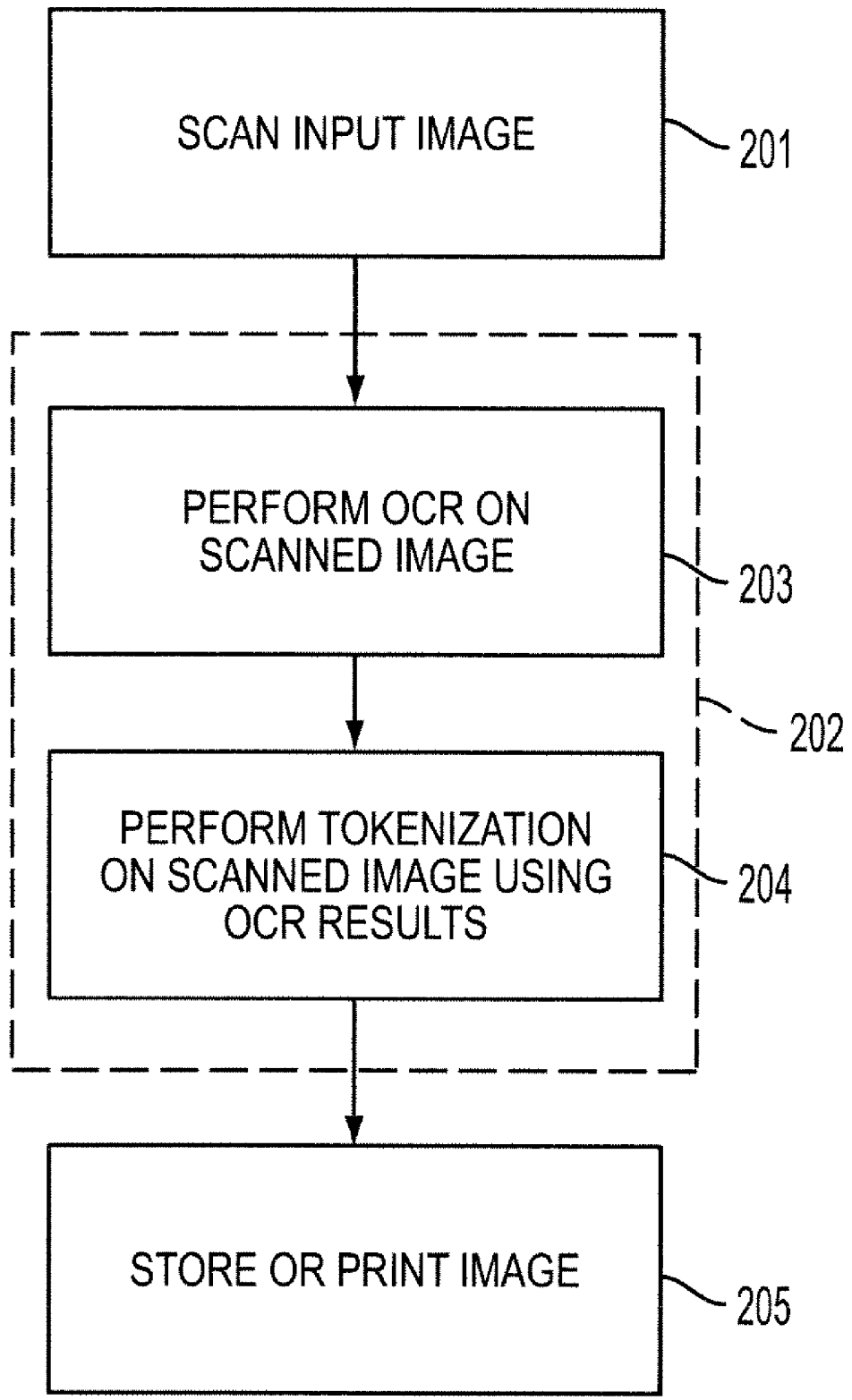
FIG. 5 is a flow chart illustrating an exemplary method of OCR-guided tokenization.

In image processing, a connected component (cc) is a set of connected pixels which have the same value. FIG. 4 is a flow diagram illustrating a tokenization algorithm for cc and incorporating aspects of the exemplary embodiments. Note that in this example the text string is "817648." The following steps may be performed:

Step 101: Set n=1 and token 1=$cc_1$.
Step 102: Set i=2.
Step 103: Get $cc_i$.
Step 104: Set j=1.
Step 105: Match $cc_i$ to token j.
Step 106: Determine whether there is a match.
Step 107: If there is a match, then $cc_i$ belongs to cluster j.
Step 108: Determine whether this is the last cc.
Step 109: If so, then stop; otherwise, set i=i+1 and return to step 103.
Step 110: If there was no match in step 106, then determine whether this is the last token.
Step 111: If it is the last token, then set n=n+1 and token n=$cc_i$, and return to step 103.
Step 112: If it is not the last token, then set j=j+1, and return to step 103.

An exemplary method of OCR-guided tokenization is illustrated in FIG. 4. The basic steps include: scanning an input image via an image input device such as the scanning system 16 to create a digital image (201), compressing the scanned (digital) image using an image compression tool such as JBIG2 via the image processing device 10 (202), wherein the image compression step includes performing OCR (Optical Character Recognition) on the scanned image (203) and then performing tokenization on the scanned image using the OCR results (204), and, finally, storing the compressed image in the storage device 14 or printing the compressed image via the image output device 18 after decoding the compressed image (205).

As stated above, OCR may be used to guide the text tokenization. More particularly, OCR is first performed on each symbol in the scanned image. For example, a symbol may be a number, letter, or other character. During the tokenization process, the OCR results are used to select appropriate matching criteria for each symbol. The symbols that are recognized as different characters are not allowed to be clustered into the same group. The symbols with the same OCR results are clustered according to the recognition confidence levels.

For each symbol, OCR often provides a list of possible recognition candidates, ordered in decreasing confidence levels. We define the first and second results (the one with the highest and the second highest confidence levels) the primary and secondary results, respectively. The following rules are applied for the tokenization:

1) The symbols with different primary OCR results are not clustered into the same group.
2) For symbols with the same primary OCR result:
   a) If both symbols have high confidence levels for primary results and low confidence levels for secondary results (both results are quite certain, and are not likely to be confused with other characters), use a loose matching criteria to allow large shape variation.
   b) If both symbols have high confidence levels for primary results and at least one has a high confidence levels for its secondary results (both results seem to be certain, but the risk of confusing with other characters exists), use a tight matching criteria to avoid misclassification.
   c) If at least one symbol has a low confidence level for its primary result (i.e., we cannot trust OCR results), use a moderate to tight matching criteria.

The OCR results may also control the pre-filtering. When a tight matching criterion is selected, no/little pre-filtering will be applied. A moderate matching criterion allows more filtering and a loose matching criterion permits most filtering.

OCR assistance can also be applied on a page basis to test for the level of loss resulting from lossy processing of the page. One alternative approach is to compare a text string found by the OCR process before and after the lossy image processing operations, such as pre-filtering and/or JBIG2 compression, to see if the same text string is generated by the OCR process. The text string has to be an identical match since, effectively, it is desirable to want to verify that any loss on the image does not cause any "functional" degradation. The match can be further qualified by the number of uncertain characters that the OCR process identified. These are the characters that have been found to be below some predefined confidence level as discussed earlier.

Another alternative approach would be to use the OCR process to help guide the level of pre-filtering that is done on a page basis. Pre-filtering is usually done to remove noise in the background or even to clean up noise on edges. This is desirable to improve image quality and, many times, increase compressibility of a page. Also, the level of pre-filtering can be set for a whole page or selected areas with the help of image segmentation. Note that the level of pre-filtering and JBIG2 matching criterion could be image and text size dependent. For larger text, more pre-filtering and looser JBIG2 match criterion can be used. It is possible use the same OCR assistance approach to optimize the level of pre-filtering and JBIG2 matching criteria on a page or area basis.

It will be appreciated that various of the above-disclosed embodiments and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. An image processing method comprising:
scanning an input image via an image input device;
compressing the scanned image using an image compression tool by performing OCR (Optical Character Recognition) on each symbol in the scanned image to generate OCR results and then performing tokenization on the scanned image using the OCR results, wherein the following rules are applied during the tokenization process:
the symbols with different primary OCR results are not clustered into the same group; and
for symbols with the same primary OCR result:
if both symbols have high confidence levels for primary results and low confidence levels for secondary results, use a loose matching criteria to allow large shape variation
if both symbols have high confidence levels for primary results and at least one has a high confidence levels for its secondary results, use a tight matching criteria to avoid misclassification;
if at least one symbol has a low confidence level for its primary result, use a moderate to tight matching criteria; and
storing the compressed image in a storage device or printing the compressed image via an image output device after it has been decoded.

2. The method defined in claim 1, wherein the image compression tool comprises JBIG2.

3. The method defined in claim 1, wherein during the tokenization process, the OCR results are used to select appropriate matching criteria for each symbol, the symbols that are recognized as different characters are not allowed to be clustered into the same group, and the symbols with the same OCR results are clustered according to a pre-defined set of recognition confidence levels.

4. The method defined in claim 1, further comprising:
performing pre-filtering on the scanned image to remove noise in the background or to clean up noise on edges; and
guiding the level of pre-filtering on a page basis using OCR results, wherein the level of pre-filtering can be set for a whole page or selected areas with the help of image segmentation.

5. The method defined in claim 1, further comprising:
finding a text string with OCR; and
comparing the text string before and after any lossy image processing operations such as pre-filtering or JBIG2 compression to determine whether the same text string is generated by the OCR process.

6. An image processing system comprising:
an image input device for scanning an input image;
an image processing device connected to the image input device and operative to compress the scanned image using an image compression tool by performing OCR (Optical Character Recognition) on the scanned image to generate OCR results and then performing tokenization on the scanned image using the OCR results and wherein the image processing device is further operative to apply the following rules during the tokenization process:
the symbols with different primary OCR results are not clustered into the same group; and
for symbols with the same primary OCR result:
if both symbols have high confidence levels for a results and low confidence levels for secondary results, use a loose matching criteria to allow large shape variation;
if both symbols have high confidence levels for primary results and at least one has a high confidence levels for its secondary results, use a tight matching criteria to avoid misclassification;
if at least one symbol has a low confidence level for its primary result, use a moderate to tight matching criteria;

a storage device connected to the image processing device and operative to store the compressed image; and
an image output device connected to the image processing device and operative to print the compressed image after it has been decoded.

7. The system defined in claim 6, wherein the image compression tool comprises JBIG2.

8. The system defined in claim 6, wherein the image processing device is further operative to use the OCR results to select appropriate matching criteria for each symbol, not allow the symbols that are recognized as different characters to be clustered into the same group, and cluster the symbols with the same OCR results according to a pre-defined set of recognition confidence levels.

9. The system defined in claim 6, wherein the image processing device is further operative to:
perform pre-filtering on the scanned image to remove noise in the background or to clean up noise on edges; and
guide the level of pre-filtering on a page basis using OCR results, wherein the level of pre-filtering can be set for a whole page or selected areas with the help of image segmentation.

10. The system defined in claim 6, wherein the image processing device is further operative to:
find a text string with OCR; and
compare the text string before and after any lossy image processing operations such as pre-filtering or JBIG2 compression to determine whether the same text string is generated by the OCR process.

11. A computer program product comprising:
non-transitory computer-readable medium storing instructions that, when executed by a computer, cause the computer to perform a method comprising:
scanning an input image via an image input device;
compressing the scanned image using an image compression tool by performing OCR (Optical Character Recognition) on the scanned image to generate OCR results and then performing tokenization on the scanned image using the OCR results, wherein the following rules are applied during the tokenization process:
the symbols with different primary OCR results are not clustered into the same group; and
for symbols with the same primary OCR result:
if both symbols have high confidence levels for primary results and low confidence levels for secondary results, use a loose matching criteria to allow large shape variation;
if both symbols have high confidence levels for primary results and at least one has a high confidence levels for its secondary results, use a tight matching criteria to avoid misclassification;
if at least one symbol has a low confidence level for its primary result, use a moderate to tight matching criteria; and
storing the compressed image in a storage device or printing the compressed image via an image output device after it has been decoded.

12. The computer program product defined in claim 11, wherein the image compression tool comprises JBIG2.

13. The computer program product defined in claim 11, wherein during the tokenization process, the OCR results are used to select appropriate matching criteria for each symbol, the symbols that are recognized as different characters are not allowed to be clustered into the same group, and the symbols with the same OCR results are clustered according to a pre-defined set of recognition confidence levels.

14. The computer program product defined in claim 11, wherein the method further comprises:

performing pre-filtering on the scanned image to remove noise in the background or to clean up noise on edges; and guiding the level of pre-filtering on a page basis, wherein the level of pre-filtering can be set for a whole page or selected areas with the help of image segmentation.

15. The computer program product defined in claim 11, wherein the method further comprises:

finding a text string with OCR; and comparing the text string before and after any lossy image processing operations such as pre-filtering or JBIG2 compression to determine whether the same text string is generated by the OCR process.

* * * * *